United States Patent Office 3,101,017
Patented Aug. 20, 1963

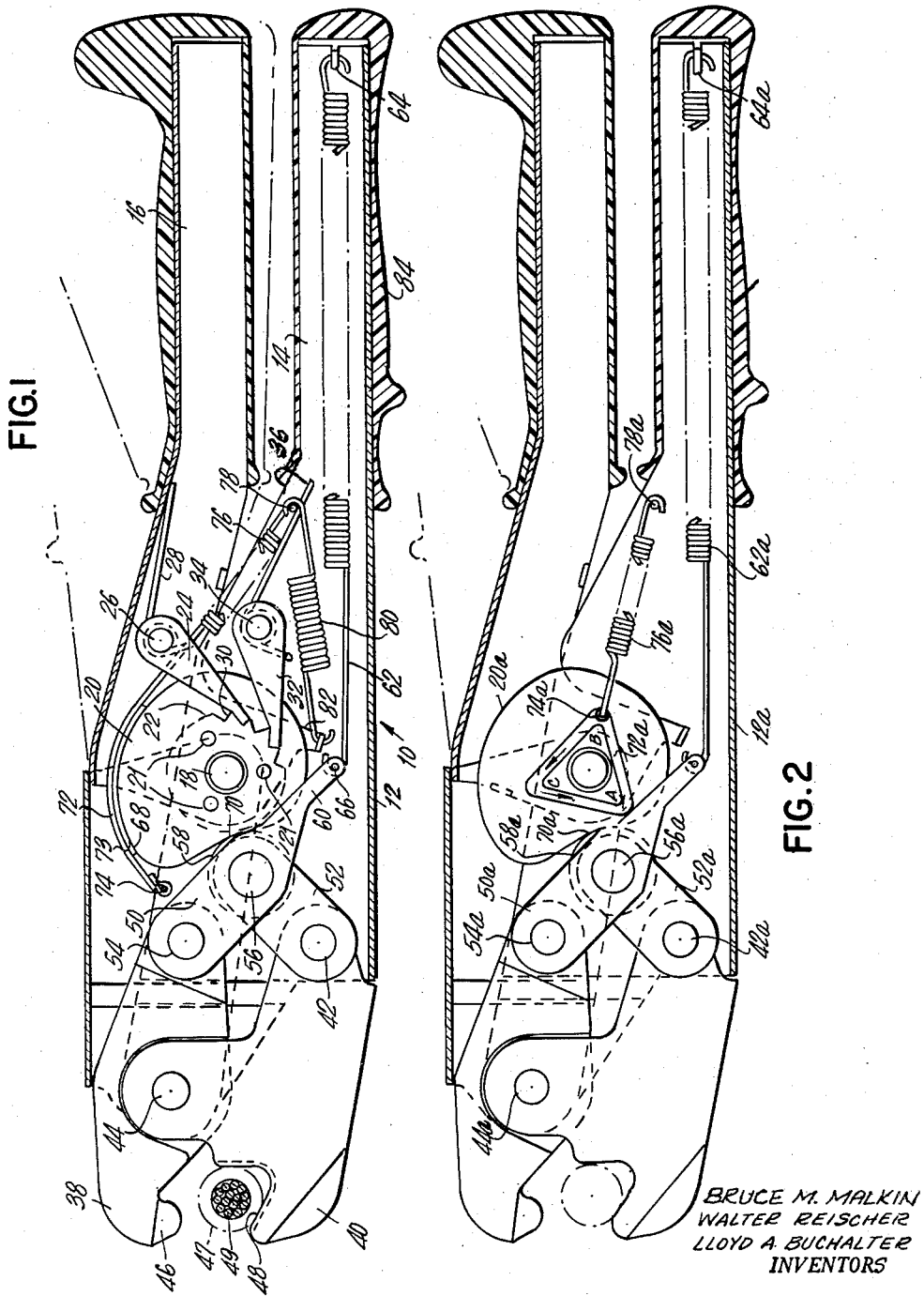

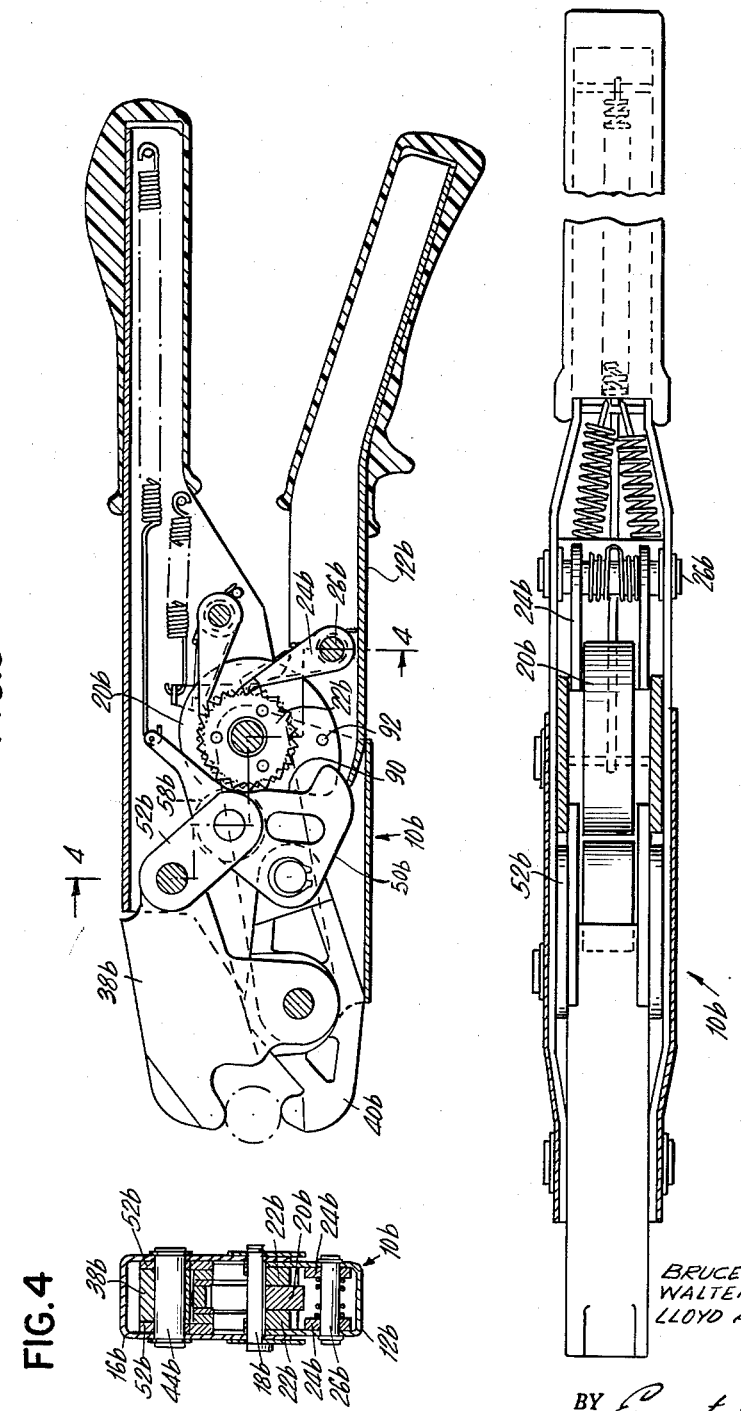

3,101,017
MULTIPLE STROKE TOOL
Bruce M. Malkin, Stamford, Walter Reischer, South Norwalk, and Lloyd A. Buchalter, Ridgefield, Conn., assignors to Burndy Corporation, a corporation of New York
Filed Dec. 29, 1959, Ser. No. 862,652
6 Claims. (Cl. 81—15)

The invention relates to a multiple stroke tool for obtaining a high mechanical advantage.

The principal object of the invention is to provide a hand tool which will permit operation with one hand, yet deliver enough force to crimp large connectors.

Another object is to provide this type of hand tool requiring a minimum number of strokes for operating the same.

A further object is to provide such a tool in which the jaws are opened at the end of the indenting stroke to permit removal of the completed connection.

Still another object is to provide a damping mechanism for braking the impact load on the driving mechanism during the cycle of operation. Yet another object is to provide a mechanism to ensure that the jaws of the tool are opened at the end of the indenting stroke to their fully open position.

These and other objects are accomplished and new results obtained, as will be apparent from the consideration of the devices described in the following specification, particularly pointed out in the claims and illustrated in the accompanying drawing in which:

FIG. 1 is a side elevation of the tool with the cover removed to show the working mechanism;

FIG. 2 illustrates diagrammatically, in side elevation, a modified form of the damping mechanism;

FIG. 3 is a side elevation of a tool similar to FIG. 1, illustrating another form of damping mechanism;

FIG. 4 is a transversal section taken in the broken plane 4—4 of FIG. 3; and

FIG. 5 is a top view of the same tool.

The multiple stroke tool 10 comprises a body 12 which terminates at one end in a handle 14. Associated therewith is a movable handle 16 pivotally mounted on the body at the pin 18 to which is also mounted the cam 20. The cam is fixed by pins 21 to a ratchet 22 driven by a pawl 24 mounted on the movable handle 16 at pin 26. A spring 28 urges the pawl into contact with the ratchet teeth 30.

The holding pawl 32 also engages the teeth 30 to lock the cam at the end of each stroke and is supported to the body by pin 34. The spring 36 similarly urges the holding pawl into contact with teeth 30.

At the other end of the tool, there is located a pair of toggle operated jaws 38 and 40. The stationary jaw 40 is supported to the body by pins 42 and 44, the latter of which acts as a pivot pin for movable jaw 38.

To form an indenting tool, jaws 38 and 40 terminate in an indentor 46 and a groove 48, respectively, for receiving and indenting a connector 47 to a conductor 49. Any type of compression or forming jaws may be used in the invention.

Jaws 38 and 40 are connected at their other ends, to toggle links 50 and 52 by means of pins 54 and 42, respectively. The links are joined at pin 56 which also supports the follower 58 in contact with the cam. The link 50 is extended to form an arm 60 which is connected to a spring 62 anchored to the body 12 at hook 64 and to the arm 60 by pin 66. The spring functions to cause the follower 58 to continuously engage the cam.

The cam is provided with an increasing radius as it rotates clock-wise in FIG. 1. At the highest point 68 of the cam, the toggle mechanism is forced by the follower 58 to fully close the indentor on the connector seated in the groove. When the cam has rotated past its highest point and falls to its starting position; namely point 70, the position shown in FIG. 1, the jaws are automatically opened by spring 62 pulling on arm 60 to permit removal of the crimped connection and the insertion of a new connector.

The cam and toggle mechanism deliver an exceptionally large force to the jaws of the tool. The jaws and toggle when compressed to their closed position tend to store energy in the manner of a spring. When the cam 20 rotates from its high (or jaws closed) position 68 to its low (or jaws open) position 70, releasing its restraint on the cam follower 58 and thus on the jaws and toggle assembly, the jaws and toggle assembly tends to release its stored energy by moving to its open position and driving or impacting the follower 58 against the cam 20. This action will tend to drive the cam past its low position preventing the jaws from returning to their fully open position and in time would cause undue wear and weaken the cam follower. To dampen this action, a friction band 72 is provided, preferably made of spring steel lined with leather 73. It is pinned, at pin 74, to the body 12; and at the other end to a spring 76, which in turn, may be anchored to a pin 78 attached to the body 12. The band 72 acts as a brake on the cam 20 as it is backlashed by the cam follower 58.

Since the band 72 is placed under tension and stores energy by its engagement by the high portion of the periphery of the cam 20, as the cam rotates clockwise and high point 68 passes away from the band 72, the band tends to release its energy by rotating the cam further clockwise. This action will drive the cam for part of its cycle when not under load, thereby reducing the number of strokes required for the complete rotation of the cam.

Pin 78 may also be used to anchor spring 80 which is mounted to arm 82, which in turn is integral with movable handle 16. Spring 80 may thus be used to open the movable handle when the pressure is removed.

A modified mechanism is shown in FIG. 2. In this construction, a triangular track 72a is provided on cam 20a. Within this track a follower 74a rides which is attached to spring 76a, in turn, pinned to 78a of the body 12a.

During the clockwise rotation of the cam 20a the follower 74a traverses two legs of the track; namely, B to C to A. When the identing cycle is completed and the cam 20a rotates clockwise so that cam follower 58a moves to the low point 70a of the cam, the follower 74a is free to traverse the third leg of the track, namely, A to B. The tendency of the cam 20a to overtravel its low position due to the return of energy from the jaw and toggle assembly through the cam follower 58a is minimized by the damping effect of spring 76a. Any actual overtravel of the cam 20a is stopped by the spring 76a before it is equal to the angular distance of one ratchet tooth; the spring 76a then rotates the cam 20a back to its low position, ensuring that the jaws will open to their full position. Other similar parts are similarly numbered with a letter "a."

The handles of the tools are preferably covered with insulation 84 to electrically insulate the tool from the operator.

In FIGS. 3, 4, and 5, we have illustrated the tool provided with another mechanism to brake the backlash action of the jaw and toggle assembly and to ensure the jaws being free to open fully.

In these views, the tool 10b is provided with a cam 20b which is rotated counter-clockwise and toggle links 50b and 52b respectively, one of which (50b) incorporates a cam surface 90 which engages the pin 92 extending from the side of cam 20b just before the high portion of cam 20b passes under cam follower 58b. As the cam rotates further to pass its low portion under the cam follower 58b, pin 92 abuts cam surface 90, obstructing movement of the link 50b and thus preventing cam follower 58b from following the cam 20b. When the cam 20b reaches its low position the pin 92 rides off cam surface 90 and releases link 50b and cam follower 58b. Part of the energy stored in the toggle and jaw assembly is expended in heat due to the friction between the pin 92 and cam surface 90, and thereafter in moving the assembly to its open position. When the cam follower 58b is released to contact the low point of cam 20b, the cam has reached its low position and the cam follower does not impact the cam into an overtravelled position.

The other similar parts to the tool of FIGS. 1 and 2 are similarly numbered, with a "b" added.

As is shown in the sectional view, FIG. 4, the ratchet 22b is positioned on both sides of the cam 20 to provide better balance. The toggle links 52b and 50b are similarly provided on both sides of the jaws 38b and 40b, respectively.

The number of ratchet teeth determines in part the number of strokes which are employed to complete the indentation and open the tool. It has been found that a force of 5,000 pounds can be obtained using handles with a length of 7", opened to the span of the hand. Thus, we are able to indent satisfactorily connectors having an outer diameter of .650", containing stranded conductors size 1/0 or smaller by using 16 strokes for each indentation. This size connector and conductor have never been indented before with a mechanical compression tool operated by a single hand.

We have thus described our invention, but we desire it understood that it is not confined to the particular forms or uses shown and described, the same being merely illustrative, and that the invention may be carried out in other ways without departing from the spirit of our invention, and therefore, we claim broadly the right to employ all equivalent instrumentalities coming within the scope of the appendent claims, and by means of which objects of our invention are obtained and new results are accomplished, as it is obvious that the particular embodiments herein shown and described are only some of the many that can be employed to obtain these objects and accomplish these results.

We claim:

1. A compression tool comprising a body, a pair of connected jaws mounted on said body, one of said jaws being movable with respect to the other, said jaws being connected to each other by toggle links to form a toggle; a cam for operating said toggle, said cam porvided with ratchet teeth, a movable handle mounted to said body, a spring actuated pawl connected to said movable handle for operating said ratchet teeth and rotating said cam, holding means mounted on said body and engaging successive teeth of said ratchet for supporting said ratchet teeth while said pawl is disengaged upon movement of said handle, said rotating cam causing said toggle to close said jaws, and means for enabling said toggle to be returned to said starting position and said jaws to be opened after said jaws have been fully closed.

2. A compression tool comprising a body, a pair of connected jaws mounted on said body, one of said jaws being movable with respect to the other, said jaws being connected to each other by toggle links to form a toggle; a cam for operating said toggle, said cam provided with ratchet teeth, a movable handle mounted to said body, a spring actuated pawl connected to said movable handle for operating said ratchet teeth and rotating said cam, holding means mounted on said body and engaging successive teeth of said ratchet for supporting said ratchet teeth while said pawl is disengaged upon movement of said handle, said rotating cam causing said toggle to close said jaws, and means for enabling said toggle to be returned to its starting position and said jaws to be opened after said jaws have been fully close, and damping means provided on said cam to reduce the impact on said cam of said toggle moving from fully closed to open position.

3. A compression tool comprising a body, a pair of connected jaws mounted on said body, one of said jaws being movable with respect to the other, said jaws being connected to each other by toggle links to form a toggle; a cam for operating said toggle, said cam provided with ratchet teeth, a movable handle mounted to said body, a spring actuated pawl connected to said movable handle for operating said ratchet teeth and rotating said cam, holding means mounted on said body and engaging successive teeth of said ratchet for supporting said ratchet teeth while said pawl is disengaged upon movement of said handle, said rotating cam causing said toggle to close said jaws, and means for enabling said toggle to be returned to its starting position and said jaws to be opened after said jaws have been fully closed the rotation of said cam is dampened by a band, spring biased against said cam.

4. The compression tool of claim 2, wherein said damping means includes a triangularly shape track, and a spring biased roller is engaged in said track.

5. The compression tool of claim 2, wherein said damping means includes a pin on the cam, said pin engaging the toggle to control the movement of the links with respect to the cam.

6. A compression tool comprising a jaw assembly including a pair of jaws one of which is movable from a closed to an open position with respect to the other jaw; a rotating cam assembly coupled to said jaws to cause said movable jaw to approach said other jaw when said cam assembly is rotated; means to bias said movable jaw in the open position; and damping means to dampen the rotation of said cam assembly when said movable jaw moves from the closed to opened position.

References Cited in the file of this patent

UNITED STATES PATENTS

| | | |
|---|---|---|
| 2,339,880 | Romanoff | Jan. 25, 1944 |
| 2,861,491 | Rozmus | Nov. 25, 1958 |
| 2,887,916 | Freedom | May 26, 1959 |